US012000416B2

(12) United States Patent
Kumagai et al.

(10) Patent No.: US 12,000,416 B2
(45) Date of Patent: Jun. 4, 2024

(54) WORK MACHINE

(71) Applicant: Hitachi Construction Machinery Co., Ltd., Tokyo (JP)

(72) Inventors: Kento Kumagai, Ami-machi (JP); Shinya Imura, Toride (JP); Yasutaka Tsuruga, Ryugasaki (JP); Takaaki Chiba, Kasumigaura (JP); Hiroaki Amano, Tsukuba (JP); Shinji Nishikawa, Kasumigaura (JP); Akihiro Narazaki, Tsukuba (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 17/637,533

(22) PCT Filed: Mar. 12, 2021

(86) PCT No.: PCT/JP2021/010147
§ 371 (c)(1),
(2) Date: Feb. 23, 2022

(87) PCT Pub. No.: WO2021/193157
PCT Pub. Date: Sep. 30, 2021

(65) Prior Publication Data

US 2022/0290406 A1 Sep. 15, 2022

(30) Foreign Application Priority Data

Mar. 27, 2020 (JP) ................................ 2020-058802

(51) Int. Cl.
*F15B 21/045* (2019.01)
*E02F 9/20* (2006.01)
(Continued)

(52) U.S. Cl.
CPC .......... *F15B 21/045* (2013.01); *E02F 9/2004* (2013.01); *E02F 9/2203* (2013.01);
(Continued)

(58) Field of Classification Search
None
See application file for complete search history.

(56) References Cited

U.S. PATENT DOCUMENTS 5,056,312 A * 10/1991 Hirata .................. E02F 9/2228 60/426
6,065,494 A * 5/2000 Thomsen ............... F15B 13/02 137/557

(Continued)

FOREIGN PATENT DOCUMENTS

JP 2-190604 A 7/1990
JP 2003-247504 A 9/2003

(Continued)

OTHER PUBLICATIONS

International Search Report (PCT/ISA/210) issued in PCT Application No. PCT/JP2021/010147 dated May 18, 2021 with English translation (four (4) pages).

(Continued)

*Primary Examiner* — Kenneth Bomberg
*Assistant Examiner* — Michael Quandt
(74) *Attorney, Agent, or Firm* — Crowell & Moring LLP

(57) ABSTRACT

A work machine that can keep the control accuracy of actuators irrespective of temperature variation of a hydraulic operating fluid that passes through flow rate controllers that control the flow rates of supply to the actuators is provided. For this purpose, the flow rate controllers each have a valve body that is disposed on a main hydraulic line connecting a delivery line of a hydraulic pump and the actuator and that moves according to an operation pressure from a solenoid (Continued)

proportional pressure reducing valve, a sampling hydraulic line that branches from the main hydraulic line, and a temperature sensor set on the sampling hydraulic line. The controller is configured to correct a command electrical signal to the solenoid proportional pressure reducing valve according to a signal from the temperature sensor.

2 Claims, 16 Drawing Sheets

(51) Int. Cl.

| | |
|---|---|
| ***E02F 9/22*** | (2006.01) |
| ***E02F 9/26*** | (2006.01) |
| ***F15B 13/02*** | (2006.01) |
| ***F15B 13/044*** | (2006.01) |
| *E02F 3/32* | (2006.01) |
| *E02F 3/42* | (2006.01) |
| *E02F 3/43* | (2006.01) |

(52) U.S. Cl.

CPC .......... *E02F 9/2228* (2013.01); *E02F 9/2267* (2013.01); *E02F 9/2271* (2013.01); *E02F 9/2285* (2013.01); *E02F 9/2292* (2013.01); *E02F 9/26* (2013.01); *F15B 13/025* (2013.01); *F15B 13/044* (2013.01); *E02F 3/32* (2013.01); *E02F 3/425* (2013.01); *E02F 3/435* (2013.01); *E02F 9/2296* (2013.01); *F15B 2211/30535* (2013.01); *F15B 2211/6343* (2013.01); *F15B 2211/6654* (2013.01)

(56) References Cited

U.S. PATENT DOCUMENTS

| | | | | |
|---|---|---|---|---|
| 8,517,039 | B2 * | 8/2013 | Seid .................... | F16H 61/0206 137/552 |
| 2013/0068309 | A1 | 3/2013 | Anderson | |
| 2021/0207345 | A1 | 7/2021 | Kobayashi et al. | |

FOREIGN PATENT DOCUMENTS

| | | | |
|---|---|---|---|
| JP | 2014-126176 | A | 7/2014 |
| JP | 2014-534381 | A | 12/2014 |
| JP | 2019-215009 | A | 12/2019 |

OTHER PUBLICATIONS

Japanese-language Written Opinion (PCT/ISA/237) issued in PCT Application No. PCT/JP2021/010147 dated May 18, 2021 (three (3) pages).

International Preliminary Report on Patentability (PCT/IB/338 & PCT/IB/373) issued in PCT Application No. PCT/JP2021/010147 dated Oct. 6, 2022, including English translation (Japanese-language Written Opinion (PCT/ISA/237), filed on Feb. 23, 2022) (five (5) pages).

Extended European Search Report issued in European Application No. 21775095.9 dated Jul. 4, 2023 (7 pages).

* cited by examiner

WORK MACHINE

TECHNICAL FIELD

The present invention relates to a work machine such as a hydraulic excavator.

BACKGROUND ART

In a work machine such as a hydraulic excavator, generally a hydraulic fluid supplied from a hydraulic pump is sent to a hydraulic actuator through a valve, and the actuator is thereby driven to carry out work. At this time, the flow rate of the hydraulic operating fluid sent to the actuator is controlled based on the valve opening amount according to an operation amount instructed by an operation device, and it can be said that the flow rate control performance of the valve determines the control accuracy of the actuator. Therefore, the valve is required to have high flow rate controllability and high robustness for stably exerting the controllability.

However, in the work machine that operates in various environments, the ambient temperature of the machine body and the temperature of the hydraulic operating fluid greatly differ or change depending on the operation area and the operation state in many cases. In the hydraulic operating fluid, characteristics such as the viscosity change depending on the temperature. Therefore, the performance of the valve that controls the hydraulic operating fluid also changes. For this reason, a technique for ensuring the robustness of the valve performance against change in the fluid temperature is required.

Thus, a technique shown in Patent Document 1 has been proposed as one of techniques that solve such a problem. According to a position control system for a pilot-operated electrohydraulic valve described in Patent Document 1, a controller of a flow control valve includes a controller including a position control mechanism of a spool, a speed conversion mechanism, and a dynamic offset mechanism, and the controller is configured to execute test processing and complement the viscosity of a hydraulic operating fluid that changes according to the temperature on the basis of data acquired in the test processing. According to such a configuration, by changing valve control characteristics according to the hydraulic operating fluid temperature, change in the flow rate control performance of the valve with respect to change in the fluid temperature can be made small.

However, in the work machine, generally the fluid temperature is acquired by a temperature sensor set in a hydraulic operating fluid tank. Therefore, there is a fear that a deviation is caused between the output value of the temperature sensor and the ambient temperature of the valve as the control target or the temperature of the hydraulic operating fluid that passes through a restrictor part and, as a result, the valve control characteristics cannot be sufficiently corrected by the controller and the flow rate control performance of the valve cannot be kept.

A technique shown in Patent Document 2 has been proposed as one of techniques that solve such a problem. In a construction machine described in Patent Document 2, a temperature sensor is disposed in a valve housing, and the temperature of the valve housing can be sensed by this configuration.

PRIOR ART DOCUMENT

Patent Documents

Patent Document 1: JP-2014-534381-A
Patent Document 2: JP-2014-126176-A

SUMMARY OF THE INVENTION

Problem to be Solved by the Invention

In the work machine of Patent Document 2, the temperature is not measured with direct contact between the temperature sensor and the hydraulic operating fluid. Therefore, there is a possibility that a large deviation is caused between the measured temperature and the hydraulic operating fluid temperature depending on the distance between the setting position of the temperature sensor and the restrictor part of the valve or the amount of heat dissipation from the housing to the atmosphere. Furthermore, there is a possibility that, when the hydraulic operating fluid with a temperature difference from the housing temperature suddenly flows in, it is impossible to immediately follow the temperature change and the accurate fluid temperature cannot be measured. Thus, there is a fear that it is impossible to carry out correction of the valve control characteristics suitable for the ambient temperature of the valve as the control target or the temperature of the hydraulic operating fluid that passes through the restrictor part and, as a result, the flow rate control performance of the valve lowers and the lowering of the actuator control accuracy is caused.

The present invention is made in view of the above-described problem, and an object thereof is to provide a work machine that can keep the control accuracy of actuators irrespective of temperature variation of a hydraulic operating fluid that passes through flow rate controllers that control the flow rates of supply to the actuators.

Means for Solving the Problem

In order to achieve the above-described object, in the present invention, in a work machine including a machine body, a work device attached to the machine body, actuators that drive the machine body or the work device, a hydraulic pump, flow rate controllers that are connected in parallel to a delivery line of the hydraulic pump and adjust the flow of a hydraulic fluid supplied from the hydraulic pump to the actuators, an operation lever for making an instruction of operation of the actuators, a pilot pump, solenoid proportional pressure reducing valves that reduce the pressure of the hydraulic fluid supplied from the pilot pump and output a resulting pressure as an operation pressure of the respective flow rate controllers, and a controller that outputs a command electrical signal to the solenoid proportional pressure reducing valves according to an operation amount instructed from the operation lever, the flow rate controllers each have a valve body that is disposed on a main hydraulic line connecting the delivery line and one of the actuators and moves according to the operation pressure from the corresponding solenoid proportional pressure reducing valve, a sampling hydraulic line that branches from the main hydraulic line, and a temperature sensor set on the sampling hydraulic line. The controller is configured to correct the command electrical signal according to a signal from the temperature sensor.

According to the present invention configured as above, the flow rates of supply to the actuators can be brought closer to target flow rates by measuring the temperature of the hydraulic operating fluid that passes through the flow rate controllers that control the flow rates of supply to the actuators and correcting the command electrical signal to the flow rate controllers according to the measurement value thereof. This makes it possible to keep the control accuracy of the actuators irrespective of temperature variation of the hydraulic operating fluid that passes through the flow rate controllers.

Advantages of the Invention

With the work machine according to the present invention, it becomes possible to keep the control accuracy of the actuators irrespective of temperature variation of the hydraulic operating fluid that passes through the flow rate controllers that control the flow rates of supply to the actuators.

MODES FOR CARRYING OUT THE INVENTION

Figure 1:
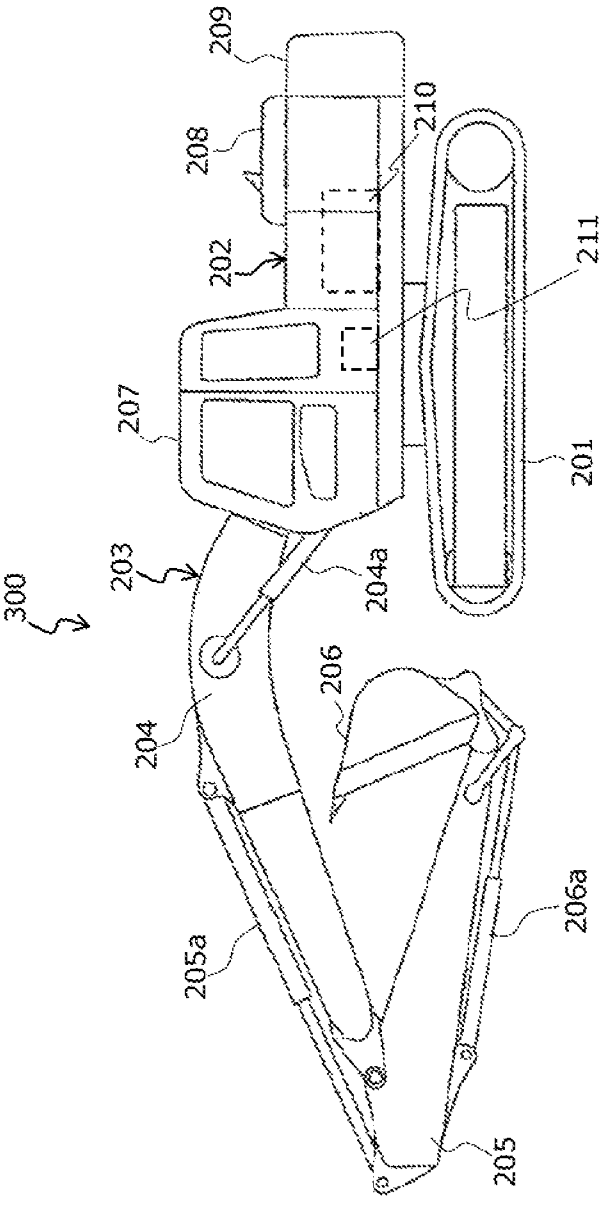
FIG. 1 is a side view of a hydraulic excavator according to an embodiment of the present invention.

Description will be made with reference to the drawings by taking a hydraulic excavator as an example as a work machine according to an embodiment of the present invention. In the respective diagrams, an equivalent component is given the same reference character, and overlapping description is omitted as appropriate.

FIG. 1 is a side view of the hydraulic excavator according to the present embodiment.

As illustrated in FIG. 1, a hydraulic excavator 300 includes a track structure 201, a swing structure 202 that is swingably disposed over the track structure 201 and configures the machine body, and a work device 203 that is attached to the swing structure 202 pivotally in the upward-downward direction and carries out excavating of earth and sand and so forth. The swing structure 202 is driven by a swing motor 211.

The work device 203 includes a boom 204 attached to the swing structure 202 pivotally in the upward-downward direction, an arm 205 attached to the tip of the boom 204 pivotally in the upward-downward direction, and a bucket 206 attached to the tip of the arm 205 pivotally in the upward-downward direction. The boom 204 is driven by a boom cylinder 204*a*. The arm 205 is driven by an arm cylinder 205*a*. The bucket 206 is driven by a bucket cylinder 206*a*.

A cab 207 is disposed at a front-side position on the swing structure 202, and a counterweight 209 to ensure the weight balance is disposed at a rear-side position. A machine chamber 208 in which an engine, a hydraulic pump, and so forth are housed is disposed between the cab 207 and the counterweight 209, and a control valve 210 is set in the machine chamber 208.

Hydraulic drive systems to be described in the following respective embodiment examples are mounted in the hydraulic excavator 300 according to the present embodiment.

First Embodiment Example

Figure 2A:
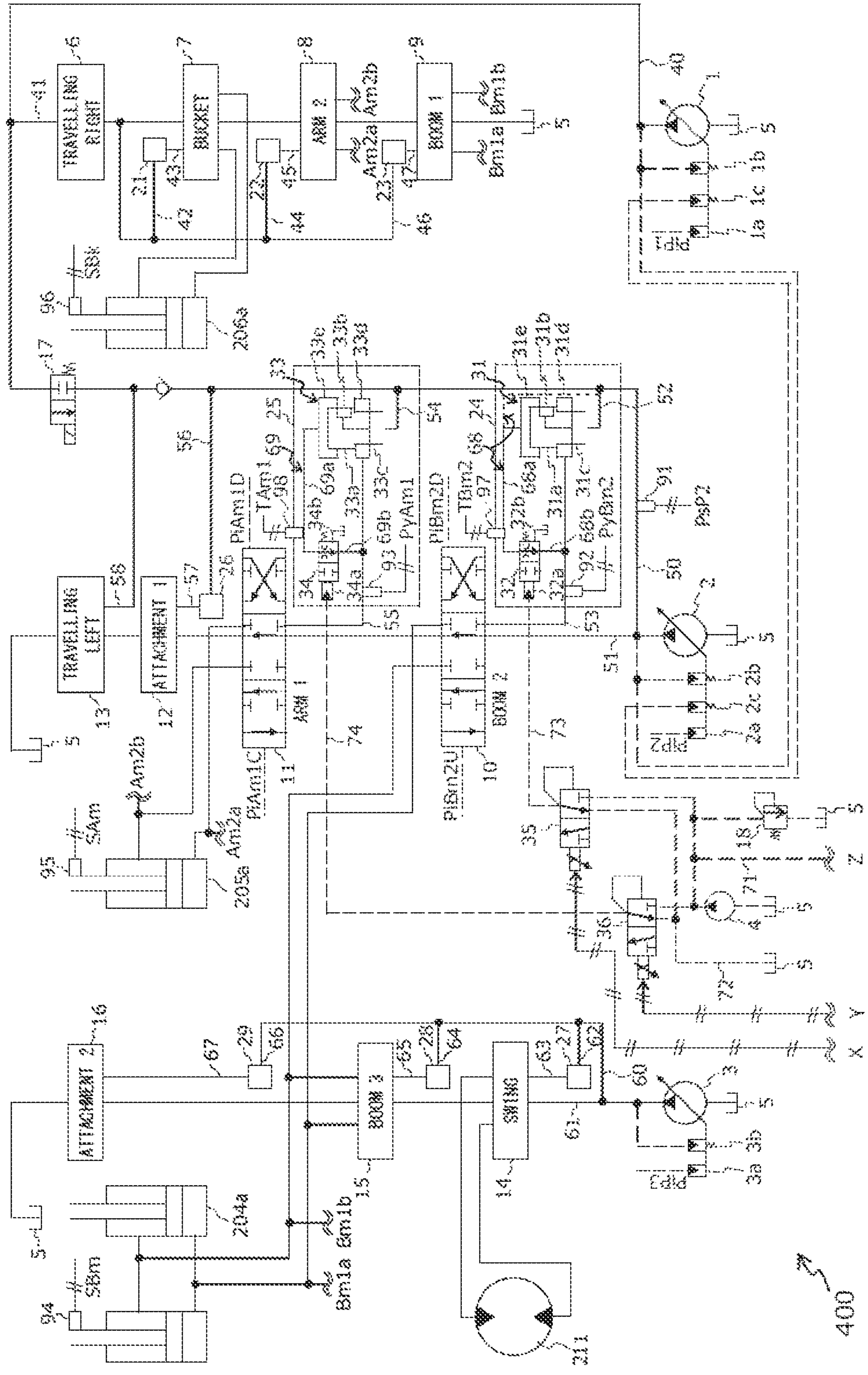
FIG. 2A is a circuit diagram (1/2) of a hydraulic drive system in a first embodiment example of the present invention.
Figure 2B:
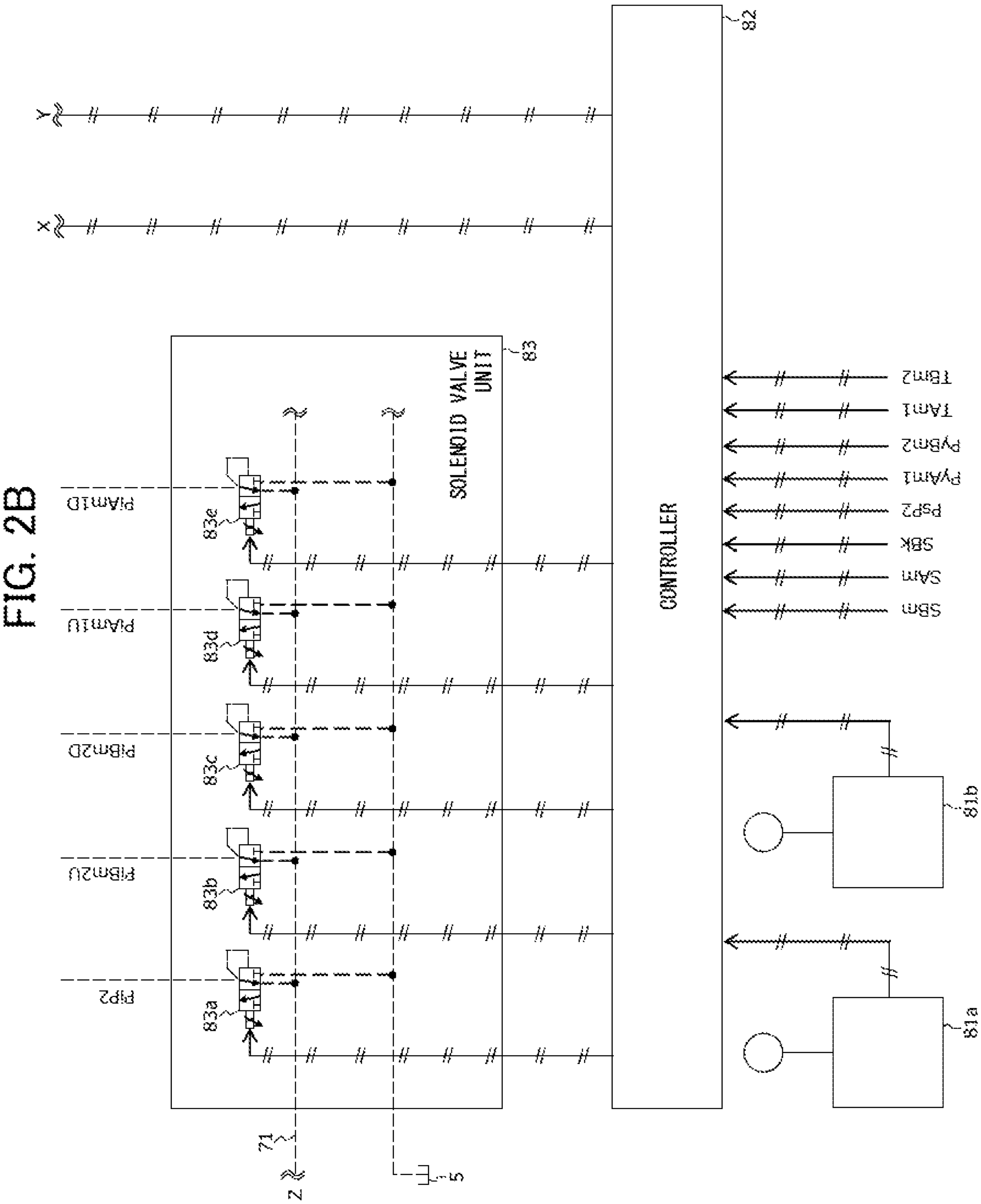
FIG. 2B is a circuit diagram (2/2) of the hydraulic drive system in the first embodiment example of the present invention.

FIG. 2A and FIG. 2B are circuit diagrams of the hydraulic drive system in a first embodiment example of the present invention.

(1) Configuration

A hydraulic drive system 400 in the first embodiment example includes three main hydraulic pumps driven by the engine that is not illustrated in the diagram, for example, a first hydraulic pump 1, a second hydraulic pump 2, and a third hydraulic pump 3 that are each formed of a variable displacement hydraulic pump. Furthermore, the hydraulic drive system 400 includes a pilot pump 4 driven by the engine that is not illustrated in the diagram, and includes a hydraulic operating fluid tank 5 that supplies a hydraulic fluid to the first to third hydraulic pumps 1 to 3 and the pilot pump 4.

The tilting angle of the first hydraulic pump 1 is controlled by a regulator annexed to the first hydraulic pump 1. The regulator of the first hydraulic pump 1 includes a flow rate control command pressure port 1*a*, a first hydraulic pump self-pressure port 1*b*, and a second hydraulic pump self-pressure port 1*c*. The tilting angle of the second hydraulic pump 2 is controlled by a regulator annexed to the second hydraulic pump 2. The regulator of the second hydraulic pump 2 includes a flow rate control command pressure port 2*a*, a second hydraulic pump self-pressure port 2*b*, and a first hydraulic pump self-pressure port 2*c*. The tilting angle of the third hydraulic pump 3 is controlled by a regulator annexed to the third hydraulic pump 3. The regulator of the third hydraulic pump 3 includes a flow rate control command pressure port 3*a* and a third hydraulic pump self-pressure port 3*b*.

A delivery line 40 of the first hydraulic pump 1 is connected to the hydraulic operating fluid tank 5 through a center bypass line 41. On the center bypass line 41, sequentially from the upstream side, a directional control valve 6 for right travelling that controls driving of a right travelling motor that is not illustrated in the diagram in a pair of travelling motors that drive the track structure 201, a directional control valve 7 for the bucket that controls the flow of the hydraulic fluid supplied to the bucket cylinder 206*a*, a second directional control valve 8 for the arm that controls the flow of the hydraulic fluid supplied to the arm cylinder 205*a*, and a first directional control valve 9 for the boom that controls the flow of the hydraulic fluid supplied to the boom cylinder 204*a* are disposed. The respective supply ports of the directional control valve 7 for the bucket, the second directional control valve 8 for the arm, and the first directional control valve 9 for the boom are connected in parallel to part of the center bypass line 41 that connects the directional control valve 6 for right travelling and the directional control valve 7 for the bucket through hydraulic lines 42 and 43, hydraulic lines 44 and 45, and hydraulic lines 46 and 47, respectively. The hydraulic lines 42 and 43, the hydraulic lines 44 and 45, and the hydraulic lines 46 and 47 each configure a main hydraulic line that connects the delivery line 40 of the first hydraulic pump 2 and the respective actuators.

A delivery line 50 of the second hydraulic pump 2 is connected to the hydraulic operating fluid tank 5 through a center bypass line 51 and is connected to the delivery line 40 of the first hydraulic pump 1 through a confluence valve 17. On the center bypass line 51, sequentially from the upstream side, a second directional control valve 10 for the boom that controls the flow of the hydraulic fluid supplied to the boom cylinder 204*a*, a first directional control valve 11 for the arm that controls the flow of the hydraulic fluid supplied to the arm cylinder 205*a*, a first directional control valve 12 for an attachment that controls the flow of the hydraulic fluid supplied to a first actuator that is not illustrated in the diagram but drives a first special attachment such as a cruncher disposed instead of the bucket 206, for example, and a directional control valve 13 for left travelling that controls driving of a left travelling motor that is not illustrated in the diagram in the pair of travelling motors that drive the track structure 201 are disposed. The respective supply ports of the second directional control valve 10 for the boom, the first directional control valve 11 for the arm, the first directional control valve 12 for an attachment, and the directional control valve 13 for left travelling are connected in parallel to the delivery line 50 of the second hydraulic pump 2 through hydraulic lines 52 and 53, hydraulic lines 54 and 55, hydraulic lines 56 and 57, and a hydraulic line 58, respectively. The hydraulic lines 52 and 53, the hydraulic lines 54 and 55, the hydraulic lines 56 and 57, and the hydraulic line 58 each configure a main hydraulic line that connects the delivery line 50 of the second hydraulic pump 2 and the respective actuators.

A delivery line 60 of the third hydraulic pump 3 is connected to the hydraulic operating fluid tank 5 through a center bypass line 61. On the center bypass line 61, sequentially from the upstream side, a directional control valve 14 for swing that controls the flow of the hydraulic fluid supplied to the swing motor 211 that drives the swing structure 202, a third directional control valve 15 for the boom that controls the flow of the hydraulic fluid supplied to the boom cylinder 204*a*, and a second directional control valve 16 for an attachment are disposed. The second directional control valve 16 for an attachment is used in order to control the flow of the hydraulic fluid supplied to a second actuator when a second special attachment including the second actuator is mounted in addition to the first special attachment or when a second special attachment including two actuators of the first actuator and the second actuator is mounted instead of the first special actuator. The respective supply ports of the directional control valve 14 for swing, the third directional control valve 15 for the boom, and the second directional control valve 16 for an attachment are connected in parallel to the delivery line 60 of the third hydraulic pump 3 through hydraulic lines 62 and 63, hydraulic lines 64 and 65, and hydraulic lines 66 and 67, respectively. The hydraulic lines 62 and 63, the hydraulic lines 64 and 65, and the hydraulic lines 66 and 67 each configure a main hydraulic line that connects the delivery line 60 of the third hydraulic pump 3 and the respective actuators.

For the boom cylinder 204*a*, the arm cylinder 205*a*, and the bucket cylinder 206*a*, stroke sensors 94, 95, and 96, respectively, that sense the stroke amount are disposed for the purpose of acquiring the operation state of the hydraulic excavator 300. Means that acquires the operation state of the hydraulic excavator 300 includes a variety of means such as an inclination sensor, a rotation angle sensor, and an IMU and is not limited to the above-described stroke sensor.

On the hydraulic lines 42 and 43 connected to the directional control valve 7 for the bucket, the hydraulic lines 44 and 45 connected to the second directional control valve 8 for the arm, and the hydraulic lines 46 and 47 connected to the first directional control valve 9 for the boom, auxiliary flow rate controllers 21, 22, and 23, respectively, that limit the flow rate of the hydraulic fluid supplied from the first hydraulic pump 1 to the respective directional control valves at the time of combined operation are disposed.

On the hydraulic lines 52 and 53 connected to the supply port of the second directional control valve 10 for the boom, the hydraulic lines 54 and 55 connected to the supply port of the first directional control valve 11 for the arm, and the hydraulic lines 56 and 57 connected to the supply port of the first directional control valve 12 for an attachment, auxiliary flow rate controllers 24, 25, and 26, respectively, that limit the flow rate of the hydraulic fluid supplied from the second hydraulic pump 2 to the respective directional control valves at the time of combined operation are disposed.

On the hydraulic lines 62 and 63 connected to the supply port of the directional control valve 14 for swing, the hydraulic lines 64 and 65 connected to the supply port of the third directional control valve 15 for the boom, and the hydraulic lines 66 and 67 connected to the supply port of the second directional control valve 16 for an attachment, auxiliary flow rate controllers 27, 28, and 29, respectively, that limit the flow rate of the hydraulic fluid supplied from the third hydraulic pump 3 to the respective directional control valves at the time of combined operation are disposed.

A delivery port of the pilot pump 4 is connected to the hydraulic operating fluid tank 5 through a pilot relief valve 18 for generation of the pilot primary pressure and is connected to a solenoid valve unit 83 through a hydraulic line 71. The solenoid valve unit 83 incorporates solenoid proportional pressure reducing valves 83*a*, 83*b*, 83*c*, 83*d*, and 83*e*. One input ports of the solenoid proportional pressure reducing valves 83*a* to 83*e* are connected to the hydraulic line 71, and the other input ports are connected to the hydraulic operating fluid tank 5. An output port of the solenoid proportional pressure reducing valve 83*a* is connected to the flow rate control command pressure port 2*a* of the regulator of the second hydraulic pump 2. Output ports of the solenoid proportional pressure reducing valves 83*b* and 83*c* are connected to pilot ports of the second directional control valve 10 for the boom. Output ports of the solenoid proportional pressure reducing valves 83*d* and 83*e* are connected to pilot ports of the first directional control valve 11 for the arm. The solenoid proportional pressure reducing valves 83*a* to 83*e* each reduce the pilot primary pressure according to a command electrical signal from a controller 82 and output the resulting pressure as a pilot command pressure.

For simplification of explanation, diagrammatic representation is omitted regarding solenoid proportional pressure reducing valves for the flow rate control command pressure ports 1*a* and 3*a* of the regulators of the first hydraulic pump 1 and the third hydraulic pump 3, a solenoid proportional pressure reducing valve for the directional control valve 6 for right travelling, a solenoid proportional pressure reducing valve for the directional control valve 7 for the bucket, a solenoid proportional pressure reducing valve for the second directional control valve 8 for the arm, a solenoid proportional pressure reducing valve for the first directional control valve 9 for the boom, a solenoid proportional pressure reducing valve for the first directional control valve 12 for an attachment, a solenoid proportional pressure reducing valve for the directional control valve 13 for left travelling, a solenoid proportional pressure reducing valve for the directional control valve 14 for swing, a solenoid proportional pressure reducing valve for the third directional control valve 15 for the boom, and a solenoid proportional pressure reducing valve for the second directional control valve 16 for an attachment.

The auxiliary flow rate controller 24 is composed of a main valve 31 that forms an auxiliary variable restrictor and has a seat shape, a control variable restrictor 31*b* that is made in a valve body 31*a* of the main valve 31 and changes the opening area according to the movement amount of the valve body 31*a*, and a pilot variable restrictor 32. A housing in which the main valve 31 is incorporated has a first pressure chamber 31*c* formed at a connecting part of the main valve 31 and the hydraulic line 52, a second pressure chamber 31*d* formed at a connecting part of the main valve 31 and the hydraulic line 53, and a third pressure chamber 31*e* formed to communicate with the first pressure chamber 31*c* through the control variable restrictor 31*b*. The third pressure chamber 31*e* and the pilot variable restrictor 32 are connected by a hydraulic line 68*a*, and the pilot variable restrictor 32 and the second pressure chamber 31*d* are connected by a hydraulic line 68*b*. The hydraulic lines 68*a* and 68*b* form a pilot line 68. For the pilot line 68, a temperature sensor 97 that senses the temperature (fluid temperature) of the hydraulic operating fluid that flows in the pilot line 68 is disposed. The first pressure chamber 31*c* configures part of the main hydraulic line 52, and the second pressure chamber 31*d* configures part of the main hydraulic line 53. The pilot line 68 configures a hydraulic line (hereinafter, sampling hydraulic line) for extracting part of the hydraulic operating fluid that passes through the valve body 31*a*. The sampling hydraulic line 68 in the present embodiment example is made to branch from the hydraulic line part (hydraulic line 53) that connects the valve body 31*a* and the first directional control valve 11 for the arm in the main hydraulic lines 52 and 53. However, the sampling hydraulic line 68 may be made to branch from the hydraulic line part (hydraulic line 52) that connects the delivery line 50 of the second hydraulic pump 2 and the valve body 31*a*.

A pilot port 32*a* of the pilot variable restrictor 32 is connected to an output port of a solenoid proportional pressure reducing valve 35. A supply port of the solenoid proportional pressure reducing valve 35 is connected to the delivery port of the pilot pump 4, and a tank port is connected to the hydraulic operating fluid tank 5.

A pressure sensor 91 is disposed on the delivery line 50 of the second hydraulic pump 2, and a pressure sensor 92 is disposed on the hydraulic line 53 that connects the second directional control valve 10 for the boom and the auxiliary flow rate controller 24.

Although diagrammatic representation is partly omitted for simplification of explanation, the auxiliary flow rate controllers 21 to 29 and peripheral equipment, conduits, and lines are all the same configuration.

The hydraulic drive system 400 includes an operation lever 81*a* that allows switching operation of the first directional control valve 9 for the boom, the second directional control valve 10 for the boom, and the third directional control valve 15 for the boom and an operation lever 81*b* that allows switching operation of the first directional control valve 11 for the arm and the second directional control valve 8 for the arm. For simplification of explanation, diagrammatic representation is omitted regarding an operation lever for right travelling with which switching operation of the directional control valve 6 for right travelling is carried out, an operation lever for the bucket with which switching operation of the directional control valve 7 for the bucket is carried out, a first operation lever for an attachment with which switching operation of the first directional control valve 12 for an attachment is carried out, an operation lever for left travelling with which switching operation of the directional control valve 13 for left travelling is carried out, an operation lever for swing with which switching operation of the directional control valve 14 for swing is carried out, and a second operation lever for an attachment with which switching operation of the second directional control valve 16 for an attachment is carried out.

The hydraulic drive system 400 includes the controller 82. Output values of the operation levers 81*a* and 81*b*, output values of the pressure sensors 91 to 93, output values of the stroke sensors 94 to 96, and output values of the temperature sensors 97 and 98 are inputted to the controller 82. Furthermore, the controller 82 outputs the command electrical signal to the respective solenoid proportional pressure reducing valves included in the solenoid valve unit 83 and the solenoid proportional pressure reducing valves 35 and 36 (and solenoid proportional pressure reducing valves that are not illustrated in the diagram).

Figure 3:
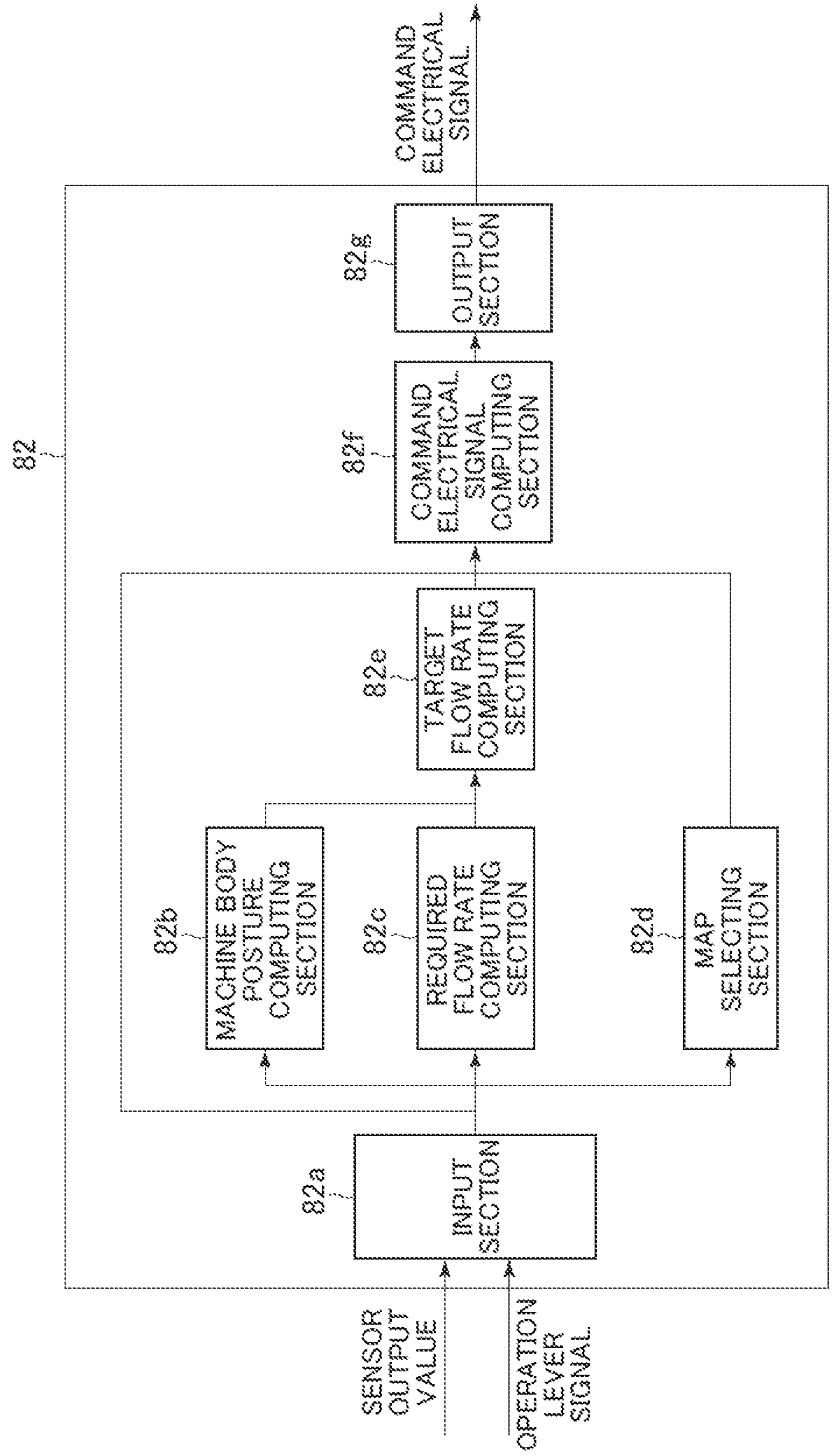
FIG. 3 is a functional block diagram of a controller in the first embodiment example of the present invention.

FIG. 3 is a functional block diagram of the controller 82. In FIG. 3, the controller 82 has an input section 82*a*, a machine body posture computing section 82*b*, a required flow rate computing section 82*c*, a map selecting section 82*d*, a target flow rate computing section 82*e*, a command electrical signal computing section 82*f*, and an output section 82*g*.

The input section 82*a* acquires an operation lever input amount and output values of the respective sensors. The machine body posture computing section 82*b* computes the posture of the machine body 202 and the work device 203 on the basis of the sensor output values. The required flow rate computing section 82*c* computes the required flow rate of the actuator on the basis of the operation lever input amount. The map selecting section 82*d* selects an opening-command electrical signal map to be used for calculation of the command electrical signal on the basis of the temperature sensor output value (fluid temperature).

Figure 4:
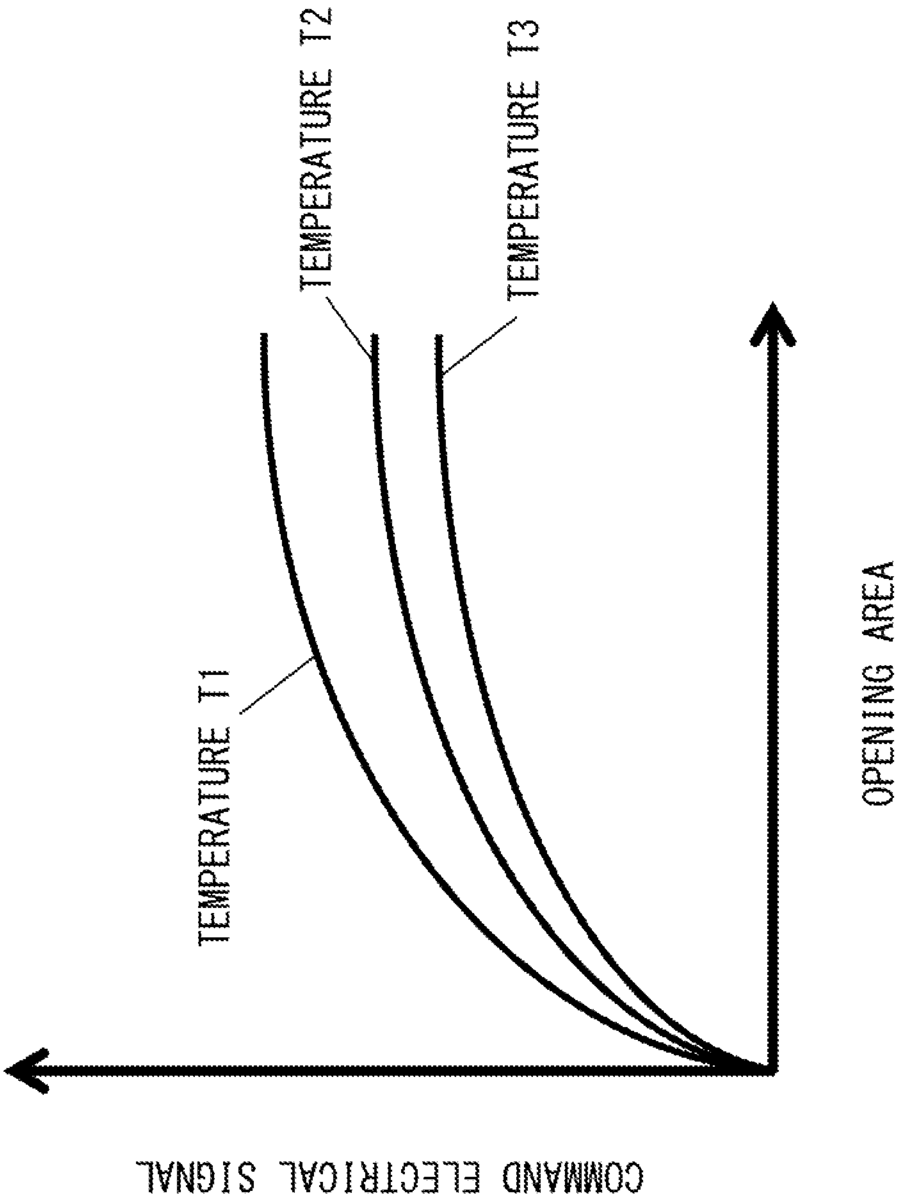
FIG. 4 is a diagram illustrating an opening-command electrical signal map of an auxiliary flow control valve in the first embodiment example of the present invention.

FIG. 4 is a diagram illustrating the opening-command electrical signal map of the auxiliary flow rate controller 24 and illustrates the correlation between the opening area of the main valve 31 and the command electrical signal of the solenoid proportional pressure reducing valve 35. In FIG. 4, temperatures T1, T2, and T3 are in a relation of T1<T2<T3. Even in the case of adjusting the opening area of the main valve 31 to the same area, the command electrical signal needs to be set larger as the fluid temperature becomes lower.

Referring back to FIG. 3, the target flow rate computing section 82*e* computes the target flow rate of the actuator on the basis of the posture of the machine body 202 and the work device 203 and the required flow rate of the actuator. The command electrical signal computing section 82*f* computes the command electrical signal on the basis of the target flow rate from the target flow rate computing section 82*e*, the opening-command electrical signal map from the map selecting section 82*d*, and the pressure sensor output value from the input section 82*a*. The output section 82*g* generates the command electrical signal on the basis of the result from the command electrical signal computing section 82*f* and outputs the command electrical signal to the respective solenoid proportional pressure reducing valves.

Figure 5:
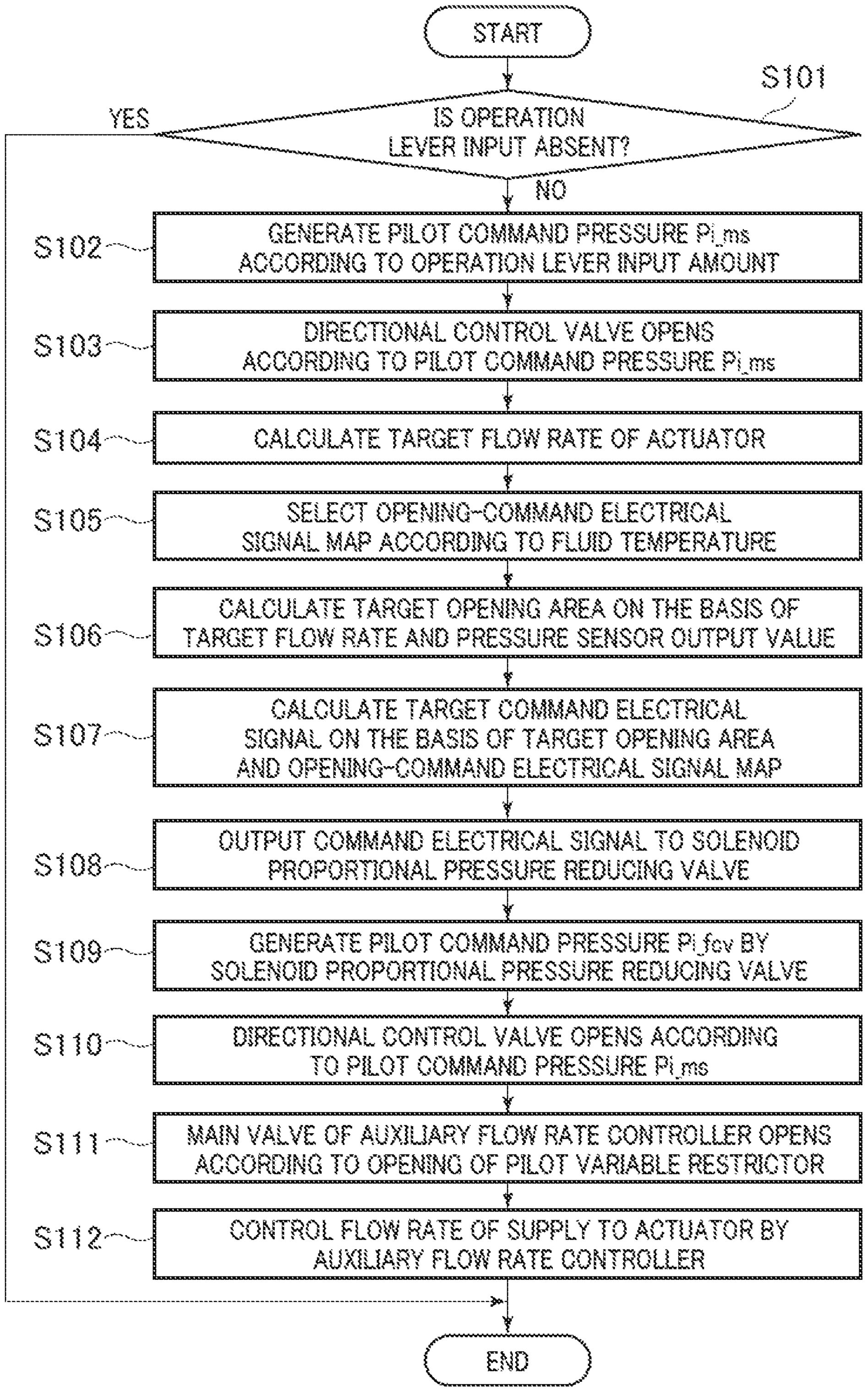
FIG. 5 is a flowchart illustrating computation processing of the controller in the first embodiment example of the present invention.

FIG. 5 is a flowchart illustrating computation processing of the controller 82 in the first embodiment example. The computation processing illustrated in FIG. 5 is executed for all the directional control valves. However, in the following, only the part relating to the second directional control valve 10 for the boom will be described.

First, the controller 82 determines whether or not input of the operation lever 81*a* is absent (step S101). When it is determined that input of the operation lever 81*a* is absent (YES) in the step S101, this flow is ended.

When it is determined that input of the operation lever 81*a* is present (NO) in the step S101, a pilot command pressure Pi_ms (PiBm2U, PiBm2D) according to the operation lever input amount is generated by the solenoid proportional pressure reducing valves 83*b* and 83*c* of the solenoid valve unit 83 (step S102), and the directional control valve 10 is opened according to the pilot command pressure Pi_ms (step S103).

Subsequently to the step S103, the target flow rate of the actuator is calculated in the target flow rate computing section 82*e* of the controller 82 (step S104), and the opening-command electrical signal map according to the fluid temperature is selected in the map selecting section 82*d* of the controller 82 (step S105). Then, the target opening area of the main valve 31 is calculated on the basis of the target flow rate and the pressure sensor output value in the command electrical signal computing section 82*f* of the controller 82 (step S106), and the target command electrical signal is calculated on the basis of the target opening area and the opening-command electrical signal map (step S107). Then, the command electrical signal is outputted to the solenoid proportional pressure reducing valve 35 by the output section 82*g* of the controller 82 (step S108).

Subsequently to the step S108, the solenoid proportional pressure reducing valve 35 generates a pilot command pressure Pi_fcv in response to the command electrical signal outputted from the controller 82 (step S109), and a pilot spool 112 of the pilot variable restrictor 32 is displaced according to the command pressure Pi_fcv from the solenoid proportional pressure reducing valve 35 (step S110). Then, the main valve 31 of the auxiliary flow rate controller 24 is opened according to the opening amount of the pilot variable restrictor 32 (step S111), and the flow rate of supply to the actuator is controlled by the auxiliary flow rate controller (step S112), and this flow is ended.

Figure 6:
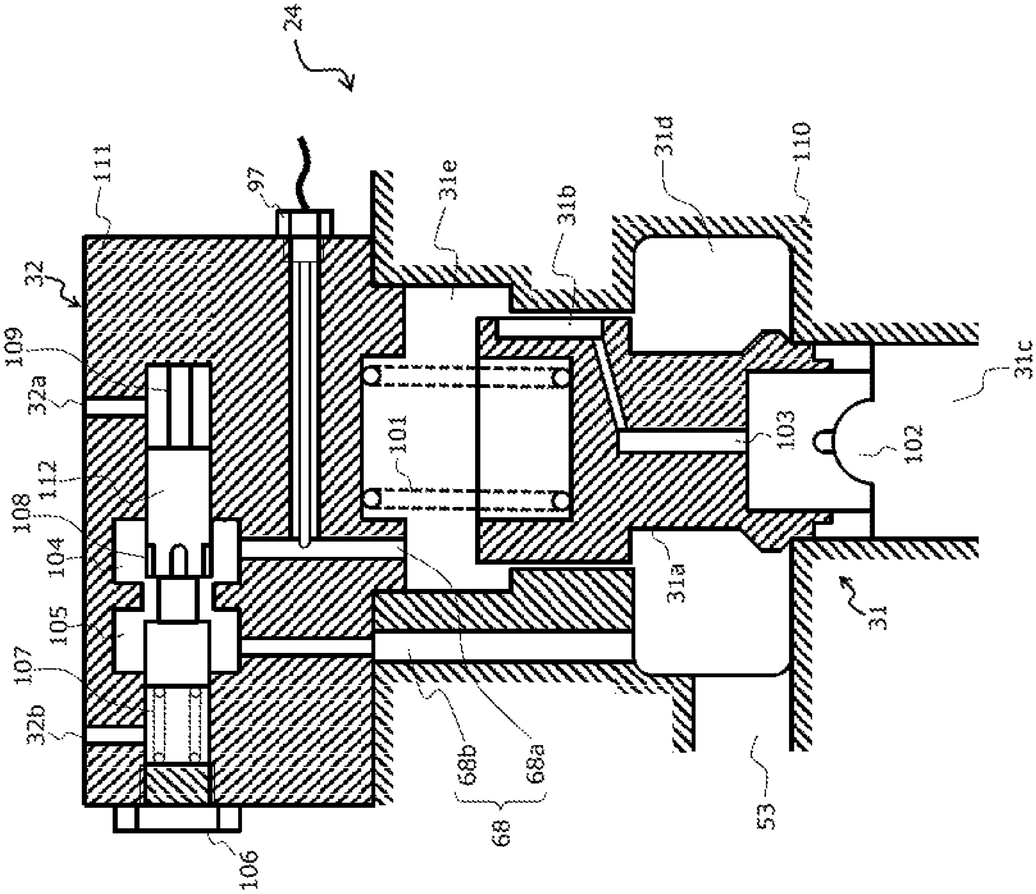
FIG. 6 is a sectional view of an auxiliary flow rate controller in the first embodiment example of the present invention.

FIG. 6 is a sectional view of the auxiliary flow rate controller 24 in the first embodiment example. The other auxiliary flow rate controllers also have configurations similar to this.

The valve body 31*a* of the main valve 31 with the seat shape is slidably set in a main housing 110. The first pressure chamber 31*c* located on the upstream side of the valve body 31*a* and the second pressure chamber 31*d* located on the downstream side communicate through an auxiliary variable restrictor formed between the main housing 110 and the valve body 31*a*. Opening characteristics of this auxiliary variable restrictor are determined by the shape of a notch 102 formed in the valve body 31*a*. The valve body 31*a* sits at an opening part that establishes communication between the first pressure chamber 31*c* and the second pressure chamber 31*d* due to a spring 101 set in the third pressure chamber 31*e*. The first pressure chamber 31*c* and the third pressure chamber 31*e* communicate through a hydraulic line 103 formed inside the valve body 31*a*. The control variable restrictor 31*b* is formed between an outlet of the hydraulic line 103 on the side of the third pressure chamber 31*e* and the main housing 110.

The pilot variable restrictor 32 is attached in a face-to-face manner with an end part of the main housing 110 in which the valve body 31*a* is set. The pilot variable restrictor 32 is configured by a pilot housing 111, the pilot spool 112, a spring 107, and a plug 106. The spring 107 is set on one end side of the pilot spool 112 and presses the pilot spool 112 toward the other end side. A rod 109 that keeps the position of the pilot spool 112 by getting contact with the pilot housing 111 is disposed on the other end side of the pilot spool 112.

A hydraulic chamber 104 and a hydraulic chamber 105 are formed between the pilot spool 112 and the pilot housing 111. The hydraulic chamber 104 and the hydraulic chamber 105 communicate by a restrictor formed between the pilot spool 112 and the pilot housing 111. Opening characteristics of this restrictor part are determined by the shape of a notch 108 formed in the pilot spool 112. The hydraulic chamber 104 and the third pressure chamber 31*e* communicate through the hydraulic line 68*a*. The hydraulic chamber 105 and the second pressure chamber 31*d* communicate through the hydraulic line 68*b*.

For the notch 102, the control variable restrictor 31*b*, and the notch 108, various shapes and a combination of them are used besides the shapes illustrated in the diagram in order to obtain opening characteristics desired by the designer.

Figure 7:
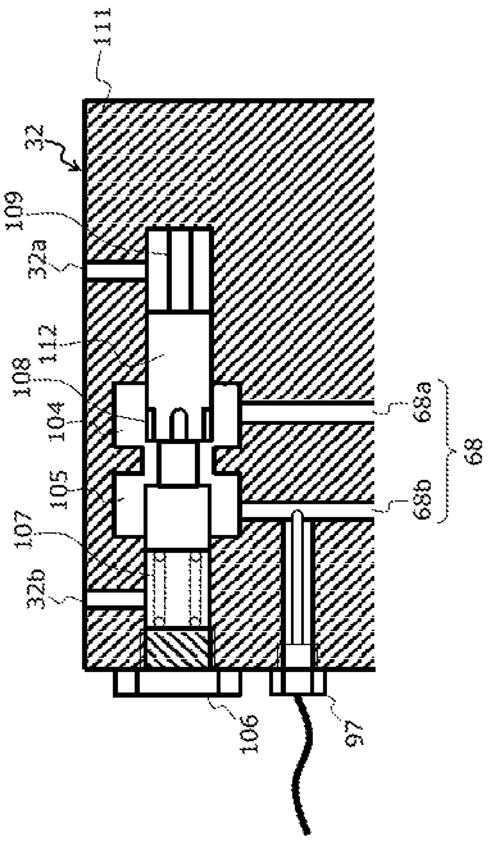
FIG. 7 is a modification example 1 of a setting method of a temperature sensor in the first embodiment example of the present invention.
Figure 8:
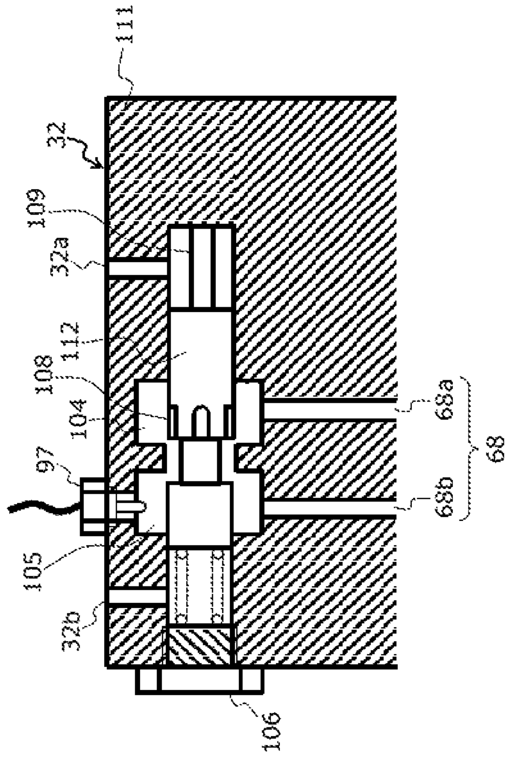
FIG. 8 is a modification example 2 of the setting method of the temperature sensor in the first embodiment example of the present invention.
Figure 9:
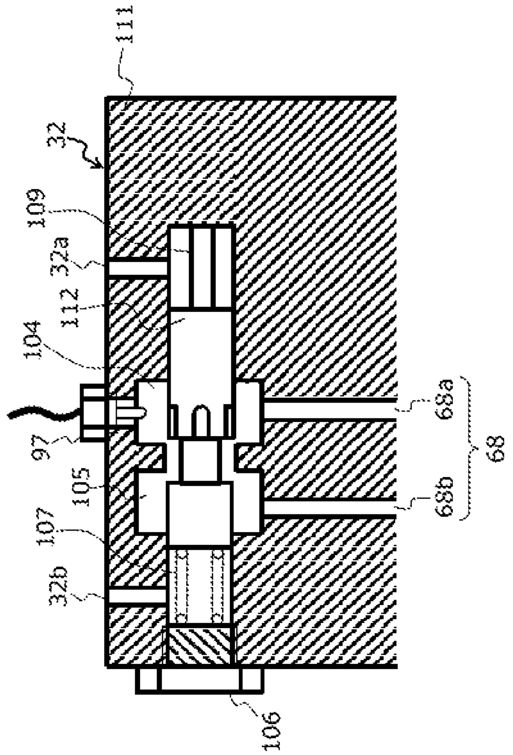
FIG. 9 is a modification example 3 of the setting method of the temperature sensor in the first embodiment example of the present invention.
Figure 10:
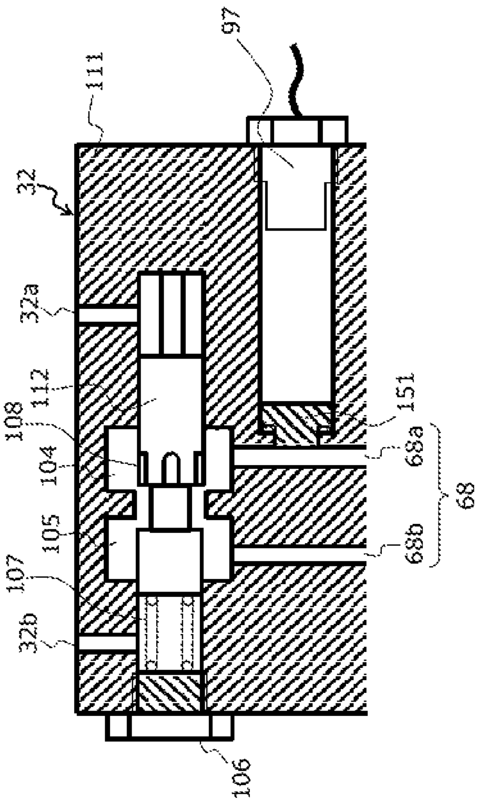
FIG. 10 is a modification example 1 of the temperature sensor in the first embodiment example of the present invention.
Figure 11:
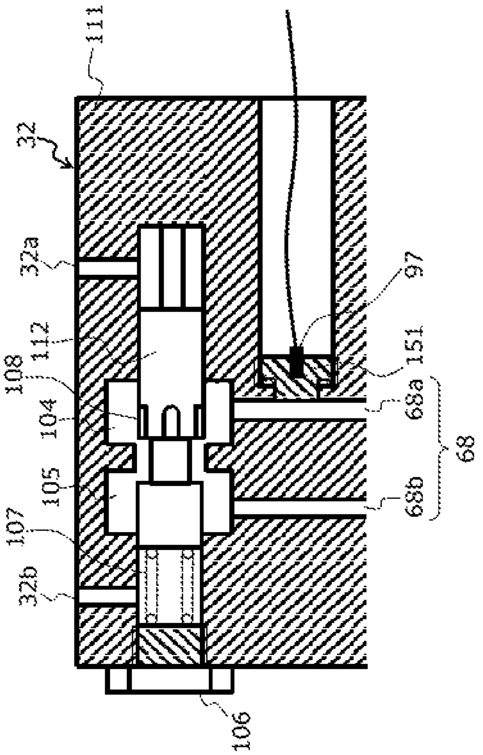
FIG. 11 is a modification example 2 of the temperature sensor in the first embodiment example of the present invention.

The temperature sensor 97 that senses the temperature of the hydraulic operating fluid flowing in the hydraulic line 68*a* is disposed in the pilot housing 111. The disposition of the temperature sensor 97 is not limited to that illustrated in FIG. 6. The temperature sensor 97 may be disposed on the hydraulic line 68*b* as illustrated in FIG. 7, may be disposed on the hydraulic chamber 105 as illustrated in FIG. 8, or may be disposed on the hydraulic chamber 104 as illustrated in FIG. 9. Furthermore, the temperature sensor 97 is not limited to that with such a form as to be directly exposed to the hydraulic operating fluid as illustrated in FIGS. 6 to 9. As illustrated in FIG. 10 or FIG. 11, a plug 151 made of a material with high thermal conductivity may be exposed to the hydraulic operating fluid that flows in the hydraulic line 68*a*, and the temperature of the plug 151 may be sensed by the temperature sensor 97 of a contactless type (illustrated in FIG. 10) or the temperature sensor 97 of an embedded type (illustrated in FIG. 11). The sampling hydraulic line 68 in the present embodiment example is configured by the pilot line (hydraulic lines 68*a* and 68*b*) and therefore is made in the pilot housing 111.

(2) Behavior

In the hydraulic drive system 400 in the first embodiment example configured as above, operation and control to be described below are possible. Here, for simply making explanation, description will be made about behavior in the case in which flow dividing is required between the second directional control valve 10 for the boom and the first directional control valve 11 for the arm disposed in parallel to the second hydraulic pump 2.

The controller 82 computes the target flow rates of the actuators 204*a* and 205*a* on the basis of the lever operation amounts inputted from the operation levers 81*a* and 81*b* and the machine body operation state acquired from the respective stroke sensors 94 to 96, and simultaneously selects the opening-command electrical signal maps of the auxiliary flow rate controllers 24 and 25 according to the hydraulic operating fluid temperatures acquired from the temperature sensors 97 and 98.

Subsequently, the controller 82 calculates the respective target opening areas of the main valves 31 and 33 by using the following expression on the basis of the respective target flow rates of the actuators 204*a* and 205*a* and the respective differential pressures across the main valves 31 and 33 acquired by the pressure sensors 91 to 93.

[Math. 1]

$$Aref=Qref/K\sqrt{\Delta P} \quad (1)$$

K is a coefficient defined according to the flow field
Aref is the target opening area
Qref is the target flow rate
ΔP is the differential pressure across the main valve Next, the controller 82 refers to the opening-command electrical signal maps to calculate the command electrical signals corresponding to the target opening areas Aref and outputs the command electrical signals to the solenoid proportional pressure reducing valves 35 and 36. The solenoid proportional pressure reducing valves 35 and 36 generate the pilot command pressure Pi_fcv according to a command electrical command from the controller 82 and makes the pilot command pressure Pi_fcv act on the pilot ports 32*a* and 34*a* of the pilot variable restrictors 32 and 34.

The pilot variable restrictors 32 and 34 displace the pilot spool 112 according to the pilot command pressure Pi_fcv to change an opening area aPS. When the opening area aPS of the pilot variable restrictors 32 and 34 changes, an opening area aFB of the control variable restrictors 31*b* and 33*b* also changes in response to it. At this time, the relation between the opening area aFB of the control variable restrictors 31*b* and 33*b* and the opening area aPS of the pilot variable restrictors 32 and 34 is as follows.

[Math. 2]

$$aFB=L\times aPS \quad (2)$$

*L is a coefficient defined according to the shape of the main valve

The opening area aFB of the control variable restrictors 31*b* and 33*b* changes according to the displacement of the main valves 31 and 33. Therefore, when the opening area aPS of the pilot variable restrictors 32 and 34 changes, the valve bodies 31*a* and 33*a* are displaced, and the ratio of the opening area aFB of the control variable restrictors 31*b* and 33*b* and the opening area aPS of the pilot variable restrictors 32 and 34 is kept constant. At this time, an opening area aMP of the main valves 31 and 33 also changes according to the displacement of the valve bodies 31*a* and 33*a*. Therefore, the opening area aMP of the main valves 31 and 33 changes according to the pilot command pressure Pi_fcv.

The behavior of the auxiliary flow rate controllers 24 and 25 has been described above. Behavior of the other auxiliary flow rate controllers is also similar.

(3) Effects

In the present embodiment example, in the work machine 300 including the machine body 202, the work device 203 attached to the machine body 202, the actuators 204*a*, 205*a*, 206*a*, and 211 that drive the machine body 202 or the work device 203, the hydraulic pumps 1 to 3, the flow rate controllers 21 to 29 that are connected in parallel to the delivery lines 40, 50, and 60 of the hydraulic pumps 1 to 3 and adjust the flow of the hydraulic fluid supplied from the hydraulic pumps 1 to 3 to the actuators 204*a*, 205*a*, 206*a*, and 211, the operation levers 81*a* and 81*b* for making an instruction of operation of the actuators 204*a*, 205*a*, 206*a*, and 211, the pilot pump 4, the solenoid proportional pressure reducing valves 35 and 36 that reduce the pressure of the hydraulic fluid supplied from the pilot pump 4 and output the resulting pressure as an operation pressure of the flow rate controllers 24 and 25, and the controller 82 that outputs the command electrical signal to the solenoid proportional pressure reducing valves 35 and 36 according to the operation amount instructed from the operation levers 81*a* and 81*b*, the flow rate controller 24 has the valve body 31*a* that is disposed on the main hydraulic lines 52 and 53 connecting the delivery line 50 and one of the actuators 204*a* and 205*a* and moves according to the operation pressure from the solenoid proportional pressure reducing valve 35, the sampling hydraulic line 68 that branches from the main hydraulic line 52 or 53, and the temperature sensor 97 set on the sampling hydraulic line 68, and the controller 82 corrects the command electrical signal according to a signal from the temperature sensor 97.

Furthermore, in the present embodiment example, the auxiliary flow rate controller 24 as the flow rate controller has the seat valve body 31*a* as the valve body that is disposed on the main hydraulic lines 52 and 53 connecting the delivery line 50 of the hydraulic pump 2 and the actuator 205*a* and moves according to the operation pressure from the solenoid proportional pressure reducing valve 35, the main housing 110 in which the seat valve body 31*a* is housed, the pilot housing 111 that encloses the seat valve body 31*a* in the main housing 110, the hydraulic chamber 31*e* formed between the seat valve body 31*a* and the pilot housing 111, the pilot line 68 that connects the downstream side of the seat valve body 31*a* and the hydraulic chamber 31*e* and decides the movement amount of the seat valve body 31*a* according to the passing flow rate, and the pilot variable restrictor 32 that is disposed on the pilot line 68 and changes the opening area according to the operation pressure from the solenoid proportional pressure reducing valve 35. In the seat valve body 31*a*, the control variable restrictor 31*b* that connects the hydraulic line part 52 connecting the hydraulic pump 2 and the seat valve body 31*a* in the main hydraulic lines 52 and 53 and the hydraulic chamber 31*e* and changes the opening area according to the movement amount of the seat valve body 31*a* is formed. The sampling hydraulic line 68 is configured by the pilot line 68.

According to the first embodiment example configured as above, the flow rates of supply to the actuators 204*a*, 205*a*, 206*a*, and 211 can be brought closer to the target flow rates by measuring the temperature of the hydraulic operating fluid that passes through the flow rate controllers 21 to 29 that control the flow rates of supply to the actuators 204*a*, 205*a*, 206*a*, and 211 and correcting the command electrical signal to the flow rate controllers 21 to 29 according to the measurement value thereof. This makes it possible to keep the control accuracy of the actuators 204*a*, 205*a*, 206*a*, and 211 irrespective of temperature variation of the hydraulic operating fluid that passes through the flow rate controllers 21 to 29.

Furthermore, the flow rate of the hydraulic operating fluid that flows in the pilot line 68 is small compared with the hydraulic line in which the hydraulic operating fluid supplied to the actuator 204*a* flows. Therefore, the load given to the temperature sensor 97 by the flow is low, and the breakdown risk of the temperature sensor 97 can be reduced. Moreover, due to the setting of the temperature sensor 97 in the pilot housing 111 configured by a separate body from the main housing 110, it becomes possible to easily replace the temperature sensor 97 when the temperature sensor 97 breaks down.

Second Embodiment Example

A second embodiment example of the present invention will be described with focus on differences from the first embodiment example.

(1) Configuration

The configuration of a hydraulic drive system in application of the first embodiment example of the present invention is almost the same as that of the hydraulic drive system 400 (illustrated in FIG. 2A and FIG. 2B) in the first embodiment example but is different in the following point.

In the first embodiment example, a temperature sensor is disposed for each of the auxiliary flow rate controllers 1 to 29. However, because the temperature of the hydraulic operating fluid that passes through the respective auxiliary flow rate controllers connected to the same delivery line is at the same level, the temperature of the hydraulic operating fluid that flows through one auxiliary flow rate controller can be approximated by the temperature of the hydraulic operating fluid that passes through another auxiliary flow rate controller. Thus, in the second embodiment example, temperature sensors are disposed for any one of the auxiliary flow rate controllers 21 to 23 connected to the delivery line 40 of the first hydraulic pump 1, any one of the auxiliary flow rate controllers 24 to 26 connected to the delivery line 50 of the second hydraulic pump 2, and any one of the auxiliary flow rate controllers 27 to 29 connected to the delivery line 60 of the third hydraulic pump 3, and a temperature sensor is not disposed for the other auxiliary flow rate controllers.

(2) Behavior

Behavior of the hydraulic drive system in the application of the first embodiment example of the present invention is almost the same as that of the hydraulic drive system 400 (illustrated in FIG. 2A and FIG. 2B) in the first embodiment example but is different in the following point.

The controller 82 executes, when controlling the auxiliary flow rate controller for which a temperature sensor is not disposed, computation processing by using the output value of the temperature sensor of another auxiliary flow rate controller connected to the same delivery line as the auxiliary flow rate controller of the control target.

(3) Effects

Also, in the second embodiment example configured as above, effects similar to those of the first embodiment example are obtained. Furthermore, the number of temperature sensors disposed for the auxiliary flow rate controllers 1 to 29 can be made small, and therefore, the manufacturing cost of the hydraulic drive system 400 can be reduced.

Third Embodiment Example

Figure 12A:
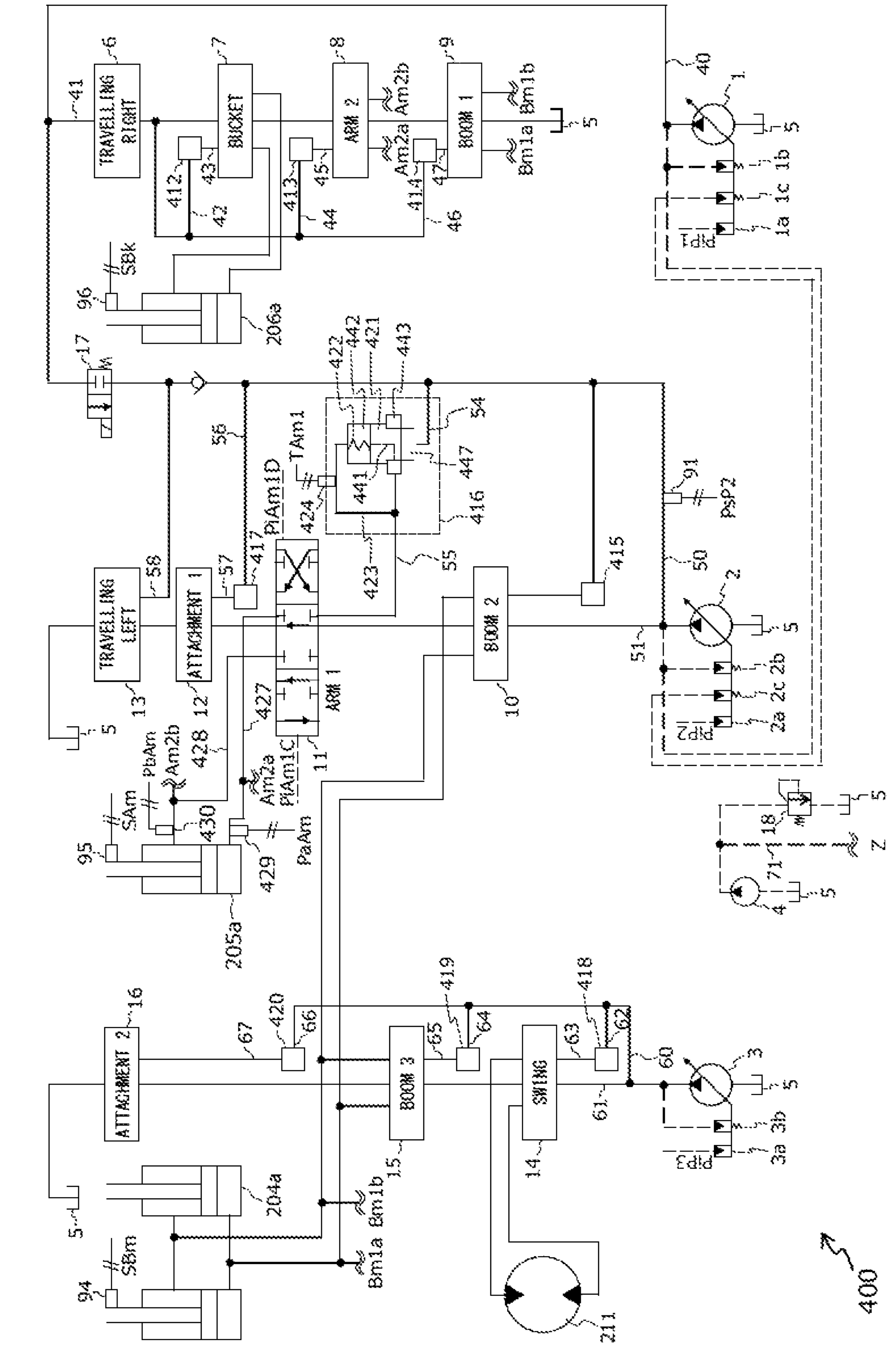
FIG. 12A is a circuit diagram (1/2) of a hydraulic drive system in a second embodiment example of the present invention.
Figure 12B:
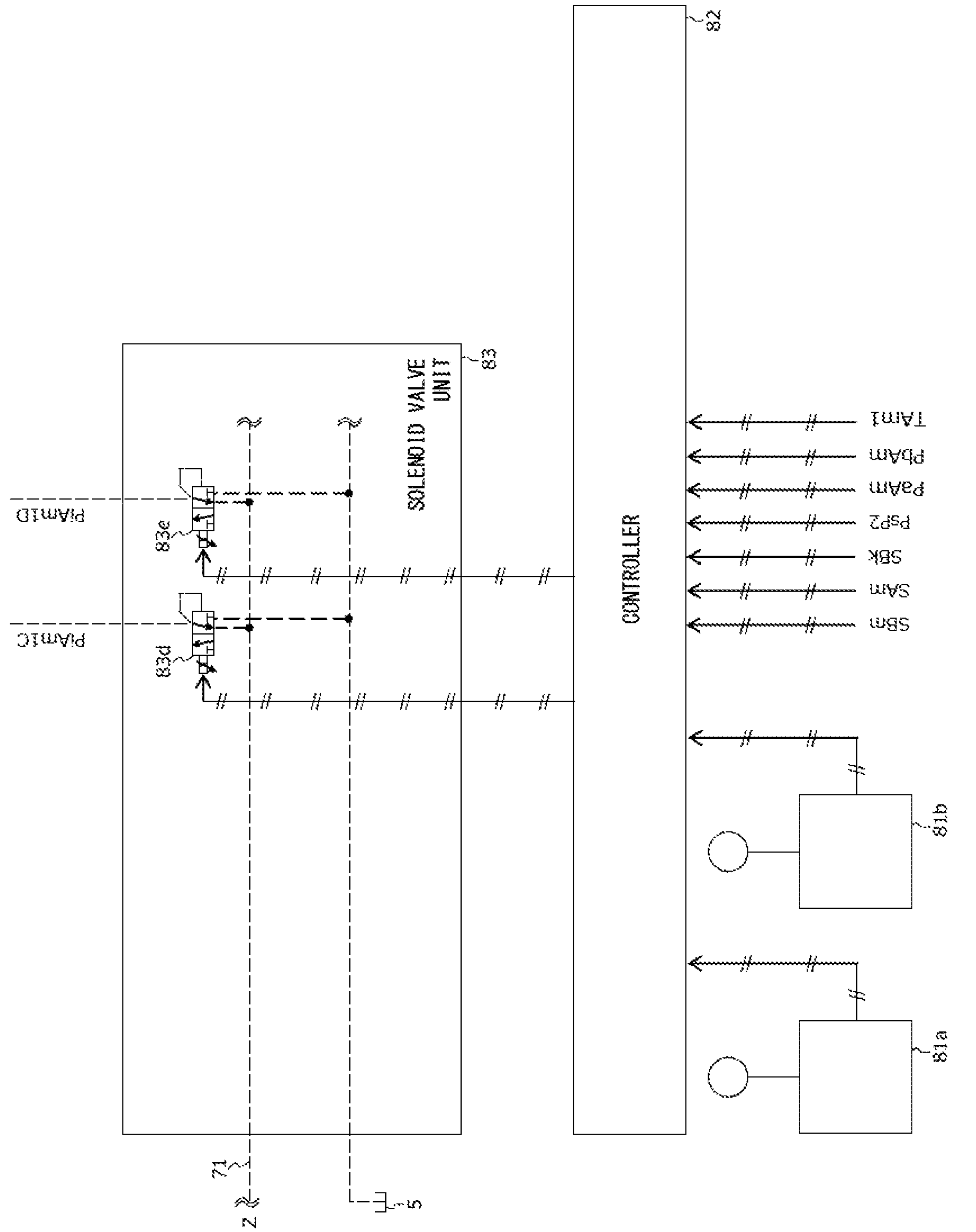
FIG. 12B is a circuit diagram (1/2) of the hydraulic drive system in the second embodiment example of the present invention.

FIG. 12A and FIG. 12B are circuit diagrams of a hydraulic drive system in a third embodiment example of the present invention.

(1) Configuration

The configuration of the hydraulic drive system in the third embodiment example is almost the same as that of the hydraulic drive system 400 (illustrated in FIG. 2A and FIG. 2B) in the first embodiment example but is different in the following point.

On the hydraulic lines 42 and 43 connected to the directional control valve 7 for the bucket, the hydraulic lines 44 and 45 connected to the second directional control valve 8 for the arm, and the hydraulic lines 46 and 47 connected to the first directional control valve 9 for the boom, check valves 412, 413, and 414, respectively, that prevent a reverse flow from the actuator side to the pump side are disposed.

On the hydraulic lines 52 and 53 connected to the supply port of the second directional control valve 10 for the boom, the hydraulic lines 54 and 55 connected to the supply port of the first directional control valve 11 for the arm, and the hydraulic lines 56 and 57 connected to the supply port of the first directional control valve 12 for an attachment, check valves 415, 416, and 417, respectively, that prevent a reverse flow from the actuator side to the pump side are disposed.

On the hydraulic lines 62 and 63 connected to the supply port of the directional control valve 14 for swing, the hydraulic lines 64 and 65 connected to the supply port of the third directional control valve 15 for the boom, and the hydraulic lines 66 and 67 connected to the supply port of the second directional control valve 16 for an attachment, check valves 418, 419, and 420, respectively, that prevent a reverse flow from the actuator side to the pump side are disposed.

The check valve 416 has a check valve body 421 with a seat shape. A housing in which the check valve body 421 is housed has a first hydraulic chamber 447 formed at a connecting part of the check valve body 421 and the hydraulic line 54, a second hydraulic chamber 443 formed at a connecting part of the check valve body 421 and the hydraulic line 55, and a third hydraulic chamber 442 formed to communicate with the second hydraulic chamber 443 through a communication hydraulic line 441 formed in the check valve body 421. The check valve body 421 sits at an opening part that establishes communication between the first hydraulic chamber 447 and the second hydraulic chamber 443 due to a spring 422 set in the third hydraulic chamber 442. The third hydraulic chamber 442 communicates with the second hydraulic chamber 443 through a communication hydraulic line 423. A temperature sensor 424 that measures the temperature of the hydraulic operating fluid (fluid temperature) is disposed on the communication hydraulic line 423.

A pressure sensor 429 is disposed on a main hydraulic line 427 that connects the second directional control valve 11 for the arm and the bottom side of the arm cylinder 205*a*. A pressure sensor 430 is disposed on a main hydraulic line 428 that connects the second directional control valve 11 for the arm and the rod side of the arm cylinder 205*a*.

Although diagrammatic representation is partly omitted for simplification of explanation, the respective actuators, the respective directional control valves, the check valves 412 to 420, and peripheral equipment, conduits, and lines are all the same configuration.

Figure 13:
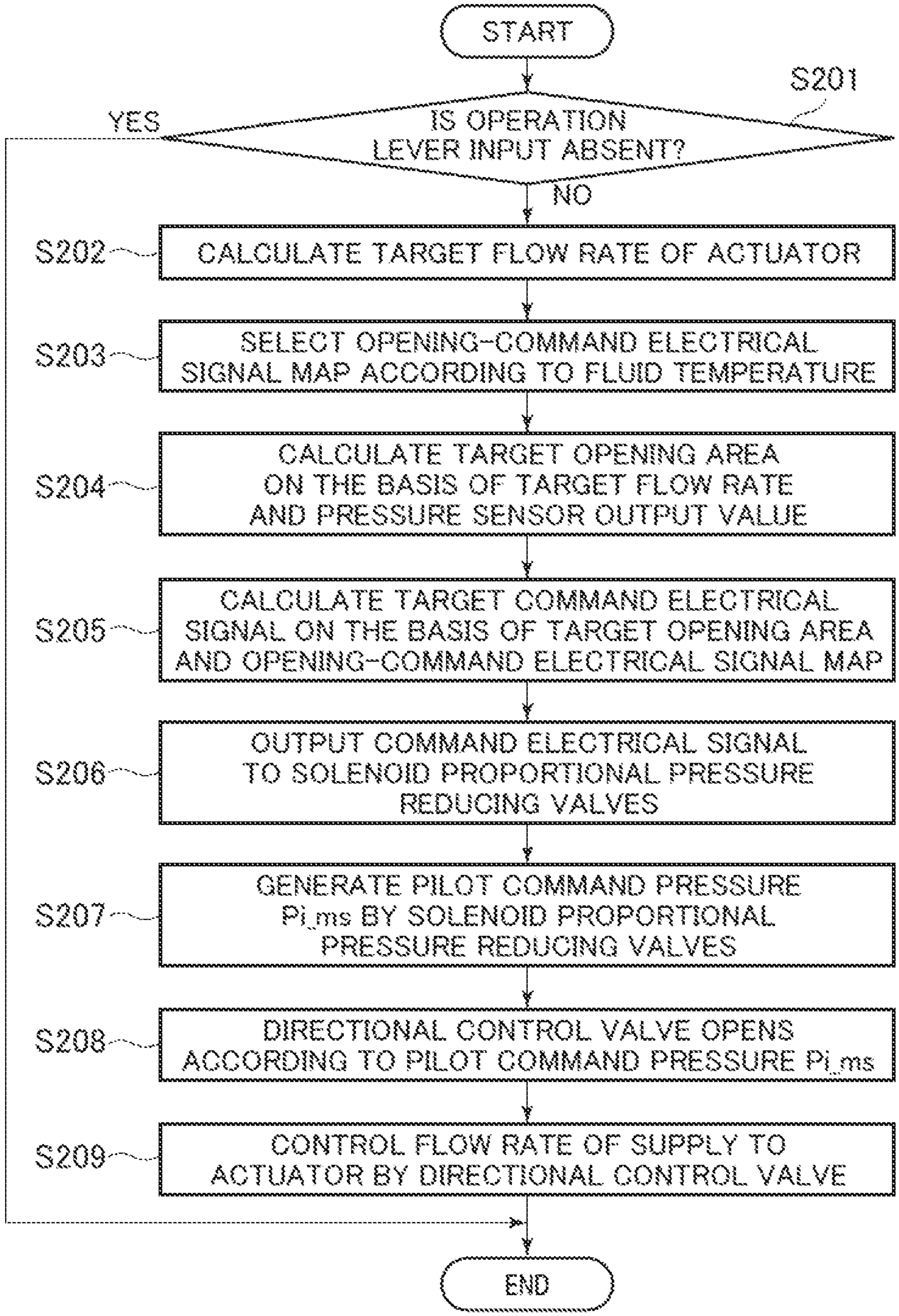
FIG. 13 is a flowchart illustrating computation processing of the controller in the second embodiment example of the present invention.

FIG. 13 is a flowchart illustrating computation processing of the controller 82 in the third embodiment example. The computation processing illustrated in FIG. 13 is executed for all the directional control valves. However, in the following, only the part relating to the first directional control valve 11 for the arm will be described.

First, the controller 82 determines whether or not input of the operation lever 81*b* is absent (step S201). When it is determined that input of the operation lever 81*b* is absent (YES) in the step S201, this flow is ended.

When it is determined that input of the operation lever 81*b* is present (NO) in the step S201, the target flow rate of the actuator 205*a* is calculated in the target flow rate computing section 432*e* of the controller 82 (step S202), and the opening-command electrical signal map according to the fluid temperature is selected in the map selecting section 82*d* of the controller 82 (step S203). Then, the target opening area of the directional control valve 11 is calculated on the basis of the target flow rate and the pressure sensor output value in the command electrical signal computing section 82*f* of the controller 82 (step S204), and the target command electrical signal is calculated on the basis of the target opening area and the opening-command electrical signal map (step S205). Then, the command electrical signal is outputted to the solenoid proportional pressure reducing valves 83*d* and 83*e* of the solenoid valve unit 83 by the output section 82*g* of the controller 82 (step S206).

Subsequently to the step S206, the solenoid proportional pressure reducing valves 83*d* and 83*e* generate the pilot command pressure Pi_ms (PiAm1U, PiAm1D) in response to the command electrical signal outputted from the controller 82 (step S207). Then, the directional control valve 11 is opened according to the pilot command pressure Pi_ms from the solenoid proportional pressure reducing valves 83*d* and 83*e* (step S208), and the flow rate of supply to the actuator 205*a* is controlled by the directional control valve 11 (step S209), and this flow is ended.

Figure 14:
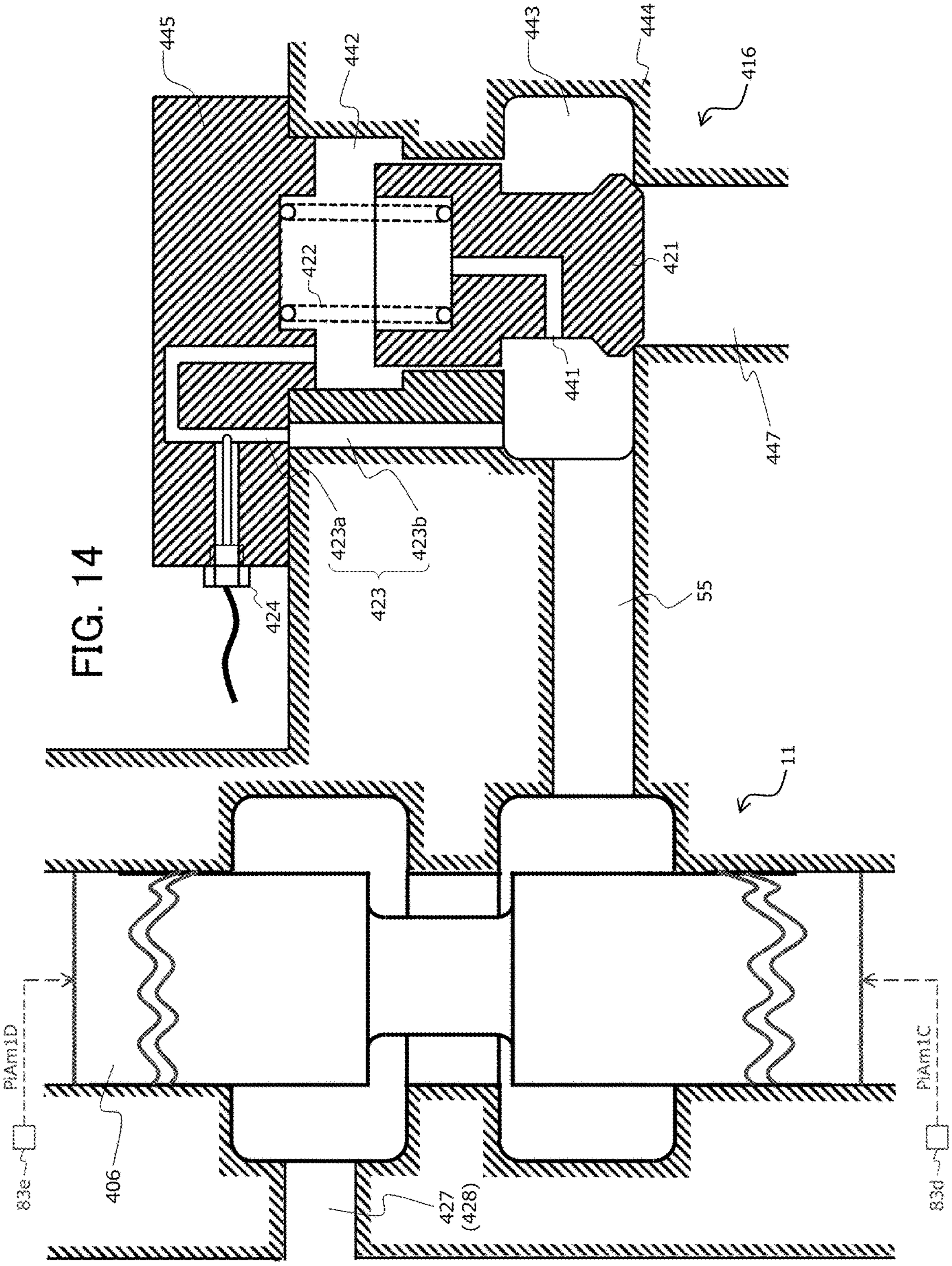
FIG. 14 is a sectional view of a directional control valve and a check valve in the second embodiment example of the present invention.

FIG. 14 is a sectional view of the first directional control valve 11 for the arm and the check valve 416 in the third embodiment example. The other directional control valves and check valves also have configurations similar to this.

The first directional control valve 11 for the arm has a spool valve body 406. The spool valve body 406 moves according to the operation pressure from the solenoid proportional pressure reducing valves 83*d* and 83*e* to establish or interrupt communication between the main hydraulic line 55 and the main hydraulic line 427 (428).

The check valve body 421 with the seat shape is slidably set in a main housing 444. The first hydraulic chamber 447 and the second hydraulic chamber 443 communicate through a check valve body opening part formed in the main housing 444. The check valve body 421 sits at the check valve body opening part due to the spring 422 set in the third hydraulic chamber 442. The second hydraulic chamber 443 and the third hydraulic chamber 442 communicate through the communication hydraulic line 441 formed inside the check valve body 421.

To the main housing 444, a cap 445 that encloses the check valve body 421 in the main housing 444 and forms the third hydraulic chamber 442 between the cap 445 and the check valve body 421 is attached. The third hydraulic chamber 442 communicates with the second hydraulic chamber 443 through the communication hydraulic line 423 composed of a hydraulic line 423*a* made in the cap 445 and a hydraulic line 423*b* made in the main housing 444. The temperature sensor 424 that measures the fluid temperature of the hydraulic operating fluid flowing in the hydraulic line 423*a* is disposed in the cap 445.

(2) Behavior

Behavior of the hydraulic drive system in the second embodiment example of the present invention is almost the same as that of the hydraulic drive system 400 (illustrated in FIG. 2A and FIG. 2B) in the first embodiment example but is different in the following point.

The controller 82 computes the target flow rate of the actuator 205*a* on the basis of the operation amount of the actuator 205*a* inputted from the operation lever 81*b* and the machine body operation state acquired from the stroke sensors 94 to 96, and simultaneously selects the opening-command electrical signal map of the directional control valve 11 on the basis of the hydraulic operating fluid temperature acquired from the temperature sensor 424.

Subsequently, the controller 82 calculates the target opening area of the directional control valve 11 by using the following expression on the basis of the target flow rate of the actuator 205*a* and the differential pressure across the directional control valve 11 acquired by the pressure sensors 91, 490, and 430.

[Math. 3]

$$Aref = Qref / K\sqrt{\Delta P} \tag{3}$$

K is a coefficient defined according to the flow field
Aref is the target opening area
Qref is the target flow rate
ΔP is the differential pressure across the directional control valve Next, the controller 82 refers to the opening-command electrical signal map to calculate the command electrical signal corresponding to the target opening area Aref and outputs the command electrical signal to the solenoid proportional pressure reducing valves 83*d* and 83*e*. The solenoid proportional pressure reducing valves 83*d* and 83*e* generate the pilot command pressure Pi_ms (PiAm1U, PiAm1D) according to the command electrical command from the controller 82 and makes the pilot command pressure Pi_ms act on the pilot ports of the directional control valve 11. The directional control valve 11 is displaced and opens with respect to the pilot command pressure Pi_ms.

(3) Effects

In the present embodiment example, the flow rate controller configured by the directional control valve 11 and the check valve 416 has the spool valve body 406 as the valve body that is disposed on the main hydraulic lines 54, 55, 427, and 428 connecting the delivery line 50 of the hydraulic pump 2 and the actuator 205*a* and moves according to the operation pressure from the solenoid proportional pressure reducing valves 83*d* and 83*e*, and the check valve body 421 disposed on the hydraulic line parts 54 and 55 that connect the hydraulic pump 2 and the spool valve body 406 in the main hydraulic lines 54, 55, 427, and 428. The flow rate controller further has the main housing 444 in which the spool valve body 406 and the check valve body 421 are housed, the cap 445 that encloses the check valve body 421 in the main housing 444, the hydraulic chamber 442 formed between the check valve body 421 and the cap 445, and the communication hydraulic line 423 that establishes communication between the downstream side of the check valve body 421 and the hydraulic chamber 442. The sampling hydraulic line 423 is configured by the communication hydraulic line 423.

According to the third embodiment example configured as above, the flow rates of supply to the actuators 204*a*, 205*a*, 206*a*, and 211 can be brought closer to the target flow rates by measuring the temperature of the hydraulic operating fluid that passes through the directional control valves 7 to 12 and 14 to 16 that control the flow rates of supply to the actuators 204*a*, 205*a*, 206*a*, and 211 and correcting the command electrical signal to the directional control valves 7 to 12 and 14 to 16 according to the measurement value thereof. This makes it possible to keep the control accuracy of the actuators 204*a*, 205*a*, 206*a*, and 211 irrespective of temperature variation of the hydraulic operating fluid that passes through the directional control valves 7 to 12 and 14 to 16.

Furthermore, the flow rate of the hydraulic operating fluid that flows in the communication hydraulic line 423 is small compared with the hydraulic line in which the hydraulic operating fluid supplied to the actuator 205*a* flows. Therefore, the load given to the temperature sensor 98 by the flow is low, and the breakdown risk of the temperature sensor 98 can be reduced. Moreover, due to the setting of the temperature sensor 98 in the cap 445 configured by a separate body from the main housing 444, it becomes possible to easily replace the temperature sensor 98 when the temperature sensor 98 breaks down.

Although the embodiment examples of the present invention have been described in detail above, the present invention is not limited to the above-described embodiment examples, and various modification examples are included. For example, the above-described embodiment examples are what are described in detail in order to explain the present invention in an easy-to-understand manner and are not necessarily limited to what includes all the configurations described. Furthermore, it is also possible to add part of a configuration of another embodiment example to a configuration of a certain embodiment example, and it is also possible to delete part of a configuration of a certain embodiment example or replace it by part of another embodiment example.

DESCRIPTION OF REFERENCE CHARACTERS

1: First hydraulic pump
1*a*: Flow rate control command pressure port (regulator)
1*b*: First hydraulic pump self-pressure port (regulator)
1*c*: Second hydraulic pump self-pressure port (regulator)
2: Second hydraulic pump
2*a*: Flow rate control command pressure port (regulator)
2*b*: Second hydraulic pump self-pressure port (regulator)
2*c*: First hydraulic pump self-pressure port (regulator)
3: Third hydraulic pump
3*a*: Flow rate control command pressure port (regulator)
3*b*: Third hydraulic pump self-pressure port (regulator)
4: Pilot pump
5: Hydraulic operating fluid tank
6: Directional control valve for right travelling (flow rate controller)
7: Directional control valve for bucket (flow rate controller)
8: Second directional control valve for arm (flow rate controller)
9: First directional control valve for boom (flow rate controller)
10: Second directional control valve for boom (flow rate controller)
11: First directional control valve for arm (flow rate controller)
12: First directional control valve for attachment (flow rate controller)
13: Directional control valve for left travelling (flow rate controller)
14: Directional control valve for swing (flow rate controller)
15: Third directional control valve for boom (flow rate controller)
16: Second directional control valve for attachment (flow rate controller)
17: Confluence valve
18: Pilot relief valve
21 to 29: Auxiliary flow rate controller (flow rate controller)
31: Main valve
31*a*: Seat valve body (valve body)
31*b*: Control variable restrictor
31*c*: First pressure chamber
31*d*: Second pressure chamber
31*e*: Third pressure chamber (hydraulic chamber)
32: Pilot variable restrictor
32*a*: Pilot port
33: Main valve
33*a*: Seat valve body (valve body)
33*b*: Control variable restrictor
33*c*: First pressure chamber
33*d*: Second pressure chamber
33*e*: Third pressure chamber (hydraulic chamber)
34: Pilot variable restrictor
34*a*: Pilot port
35, 36: Solenoid proportional pressure reducing valve
40: Delivery line
41: Center bypass line
42 to 47: Hydraulic line (main hydraulic line)
50: Delivery line
51: Center bypass line
52 to 58: Hydraulic line (main hydraulic line)
60: Delivery line
61: Center bypass line
62 to 67: Hydraulic line (main hydraulic line)
68: Pilot line (sampling hydraulic line)
68*a*, 68*b*: Hydraulic line
69: Pilot line (sampling hydraulic line)
69*a*, 69*b*: Hydraulic line
71 to 74: Hydraulic line
81*a*, 81*b*: Operation lever
82: Controller
82*a*: Input section
82*b*: Machine body posture computing section
82*c*: Required flow rate computing section
82*d*: Map selecting section
82*e*: Target flow rate computing section
82*f*: Command electrical signal computing section
82*g*: Output section
83: Solenoid valve unit
83*a* to 83*e*: Solenoid proportional pressure reducing valve
91 to 93: Pressure sensor
94 to 96: Stroke sensor
97: Temperature sensor
101: Spring
102: Notch
103: Hydraulic line
104, 105: Hydraulic chamber
106: Plug
107: Spring
108: Notch
109: Rod

110: Main housing
111: Pilot housing
112: Pilot spool
151: Plug
201: Track structure
202: Swing structure (machine body)
203: Work device
204: Boom
204*a*: Boom cylinder (actuator)
205: Arm
205*a*: Arm cylinder (actuator)
206: Bucket
206*a*: Bucket cylinder (actuator)
207: Cab
208: Machine chamber
209: Counterweight
210: Control valve
211: Swing motor (actuator)
300: Hydraulic excavator (work machine)
400: Hydraulic drive system
406: Spool valve body (valve body)
412 to 420: Check valve (flow rate controller)
421: Check valve body
422: Spring
423: Communication hydraulic line (sampling hydraulic line)
423*a*, 423*b*: Hydraulic line
424: Temperature sensor
427, 428: Hydraulic line (main hydraulic line)
429, 430: Pressure sensor
441: Communication hydraulic line
442: Third hydraulic chamber
443: Second hydraulic chamber
444: Main housing
445: Cap
447: First hydraulic chamber

The invention claimed is:

1. A work machine comprising:
a machine body;
a work device attached to the machine body;
actuators that drive the machine body or the work device;
a hydraulic pump;
flow rate controllers that are connected in parallel to a delivery line of the hydraulic pump and adjust a flow of a hydraulic fluid supplied from the hydraulic pump to the actuators;
an operation lever for making an instruction of operation of the actuators;
a pilot pump;
solenoid proportional pressure reducing valves that reduce pressure of the hydraulic fluid supplied from the pilot pump and output a resulting pressure as an operation pressure of the respective flow rate controllers; and
a controller that outputs a command electrical signal to the solenoid proportional pressure reducing valves according to an operation amount instructed from the operation lever,
wherein the flow rate controllers each have:
a valve body that is disposed on a main hydraulic line connecting the delivery line and one of the actuators and moves according to the operation pressure from the corresponding solenoid proportional pressure reducing valve,
a sampling hydraulic line that branches from the main hydraulic line, and
a temperature sensor set on the sampling hydraulic line,
wherein the controller is configured to correct the command electrical signal according to a signal from the temperature sensor,
wherein the valve body is a seat valve body,
wherein the flow rate controllers each have:
a main housing in which the seat valve body is housed,
a pilot housing that encloses the seat valve body in the main housing,
a hydraulic chamber formed between the seat valve body and the pilot housing, and
a pilot variable restrictor that is disposed on the pilot line and changes an opening area according to the operation pressure from the corresponding solenoid proportional pressure reducing valve,
wherein a control variable restrictor is formed in the seat valve body and changes an opening area according to the movement amount of the seat valve body, the control variable restrictor connecting a hydraulic line part and the hydraulic chamber, the hydraulic line part connecting the hydraulic pump and the seat valve body in the main hydraulic line,
wherein the sampling hydraulic line is a pilot line that connects a downstream side of the seat valve body and the hydraulic chamber, the sampling hydraulic line deciding a movement amount of the seat valve body according to a passing flow rate.

2. A work machine, comprising:
a machine body;
a work device attached to the machine body;
actuators that drive the machine body or the work device;
a hydraulic pump;
flow rate controllers that are connected in parallel to a delivery line of the hydraulic pump and adjust a flow of a hydraulic fluid supplied from the hydraulic pump to the actuators;
an operation lever for making an instruction of operation of the actuators;
a pilot pump;
solenoid proportional pressure reducing valves that reduce pressure of the hydraulic fluid supplied from the pilot pump and output a resulting pressure as an operation pressure of the respective flow rate controllers; and
a controller that outputs a command electrical signal to the solenoid proportional pressure reducing valves according to an operation amount instructed from the operation lever,
wherein the flow rate controllers each have:
a valve body that is disposed on a main hydraulic line connecting the delivery line and one of the actuators and moves according to the operation pressure from the corresponding solenoid proportional pressure reducing valve,
a sampling hydraulic line that branches from the main hydraulic line, and
a temperature sensor set on the sampling hydraulic line,
wherein the controller is configured to correct the command electrical signal according to a signal from the temperature sensor,
wherein the valve body is a spool valve body,
wherein the flow rate controllers each further have
a check valve body disposed on a hydraulic line part connecting the hydraulic pump and the spool valve body in the main hydraulic line,
a main housing in which the spool valve body and the check valve body are housed,
a cap that encloses the check valve body in the main housing, a hydraulic chamber formed between the check valve body and the cap, and wherein the sampling hydraulic line is a communication hydraulic line that establishes communication between a downstream side of the check valve body and the hydraulic chamber.

* * * * *